United States Patent
Markham et al.

(10) Patent No.: US 8,892,854 B2
(45) Date of Patent: Nov. 18, 2014

(54) DEVICES THAT RECEIVE DATA WHILE NOT DIRECTLY POWERED

(75) Inventors: Thomas R. Markham, Fridley, MN (US); Bruce W. Anderson, Andover, MN (US)

(73) Assignee: Honeywell International Inc., Morristown, NJ (US)

( * ) Notice: Subject to any disclaimer, the term of this patent is extended or adjusted under 35 U.S.C. 154(b) by 489 days.

(21) Appl. No.: 13/078,700

(22) Filed: Apr. 1, 2011

(65) Prior Publication Data

US 2012/0254635 A1 Oct. 4, 2012

(51) Int. Cl.
*G06F 17/00* (2006.01)
*G06F 1/26* (2006.01)
*G06F 1/32* (2006.01)

(52) U.S. Cl.
CPC .............. *G06F 1/3203* (2013.01); *G06F 1/263* (2013.01); *G06F 1/3287* (2013.01); *Y02B 60/1217* (2013.01); *G06F 1/3231* (2013.01)
USPC ............ 713/1; 713/100; 235/275; 340/10.51; 340/4.3

(58) Field of Classification Search
USPC .............. 713/1, 100; 235/375; 340/10.51, 4.3
See application file for complete search history.

(56) References Cited

U.S. PATENT DOCUMENTS

| | | | | |
|---|---|---|---|---|
| 6,876,295 | B1* | 4/2005 | Lewis | 340/10.34 |
| 7,825,776 | B2* | 11/2010 | Smith et al. | 340/10.51 |
| 7,902,964 | B2* | 3/2011 | Rommelmann et al. | 340/10.51 |
| 8,477,045 | B2* | 7/2013 | Laffey et al. | 340/815.63 |
| 2005/0168159 | A1* | 8/2005 | Nagasawa et al. | 315/224 |
| 2008/0303640 | A1* | 12/2008 | Rommelmann et al. | 340/10.51 |

FOREIGN PATENT DOCUMENTS

EP 2138961 12/2009

OTHER PUBLICATIONS

Search Report for related EP Application, 12161616.3-1959, dated Oct. 11, 2013, 3 pages.

* cited by examiner

*Primary Examiner* — M. Elamin
(74) *Attorney, Agent, or Firm* — Brooks, Cameron & Huebsch, PLLC

(57) ABSTRACT

Devices that receive data while not directly powered and methods of operating devices that receive data while not directly powered are described herein. One or more device embodiments include an interface configured to receive data from an additional device while the device is not directly powered, a memory coupled to the interface and configured to receive the data from the interface while the device is not directly powered and store the data while the device is not directly powered, and a user interface configured to permit a user to interact with the computing device. The computing device is configured to operate in at least two different power modes, wherein the computing device is powered only via the interface while operating in a first power mode and the computing device is powered by a non-radio frequency (non-RF) power source while operating in a second power mode.

16 Claims, 2 Drawing Sheets

DEVICES THAT RECEIVE DATA WHILE NOT DIRECTLY POWERED

TECHNICAL FIELD

The present disclosure relates to devices that receive data while not directly powered and methods of operating devices that receive data while not directly powered.

BACKGROUND

A device (e.g., a computing device) may receive data, such as, for example, configuration data, that may be personalized for that device. For example, data may be sent to, received by, loaded into, programmed into, and/or stored in the device before the device is deployed to an end consumer (e.g., as part of the manufacturing and/or provisioning process of the device, at the location where the device is manufactured, and/or at the point of sale of the device).

A device (e.g., a computing device) may also transmit data, such as, for example, history, usage, and/or diagnostic data, associated with the device to an additional device. For example, data may be transmitted by the device to the additional device while the device is in the field and/or while the device is out of the field (e.g., while the device is sent back for service).

In order to receive and/or transmit data, however, the device may have to be directly powered and/or powered on. For example, the device may need to be coupled to an external power wire and/or include a battery in order to receive and/or transmit data.

Directly powering the device, however, can be difficult and/or time consuming. For example, before the device is deployed to an end consumer, the device may be located inside packaging (e.g., a box, a shipping container, protective wrapping, etc.) and accordingly may need to be removed from the package in order to be directly powered. Further, while the device is in and/or out of the field, access to mechanisms for directly powering the device (e.g., access to external power wires and/or batteries) may be limited and/or nonexistent.

DETAILED DESCRIPTION

Figure 1:
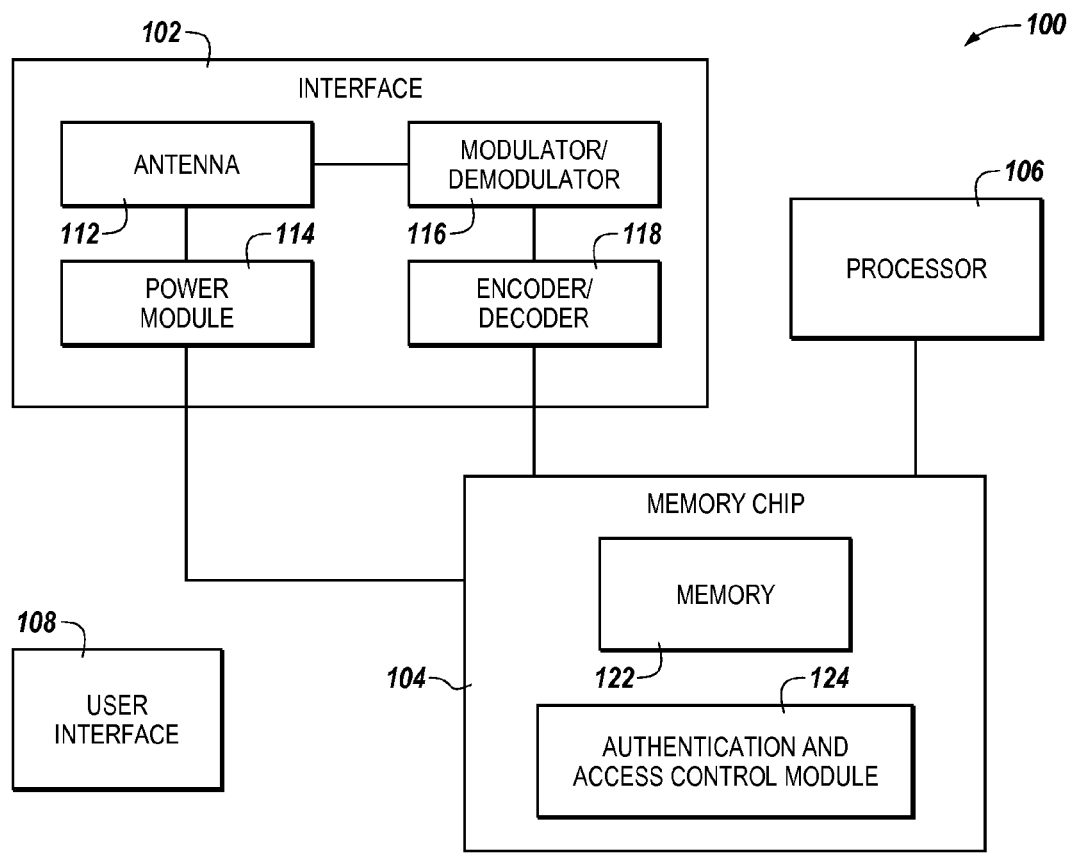
FIG. 1 illustrates a portion of a computing device in accordance with one or more embodiments of the present disclosure.

Devices that receive data while not directly powered and methods of operating devices that receive data while not directly powered are described herein. One or more device embodiments include an interface configured to receive data from an additional device while the device is not directly powered, a memory coupled to the interface and configured to receive the data from the interface while the device is not directly powered and store the data while the device is not directly powered, and a user interface configured to permit a user to interact with the computing device. The computing device is configured to operate in at least two different power modes, wherein the computing device is powered only via the interface while operating in a first power mode and the computing device is powered by a non-radio frequency (non-RF) power source while operating in a second power mode.

Devices in accordance with one or more embodiments of the present disclosure can receive and/or transmit data while not directly powered and/or while powered off. For example, devices in accordance with one or more embodiments of the present disclosure can receive and/or transmit data without being coupled to an external power wire and/or without using a battery.

Accordingly, devices in accordance with one or more embodiments of the present disclosure can receive and/or transmit data without the difficulty and/or time consumption associated with directly powering the device. For example, devices in accordance with one or more embodiments of the present disclosure can receive and/or transmit data while located inside packaging (e.g., without being removed from the packaging). Further, devices in accordance with one or more embodiments of the present disclosure can receive and/or transmit data in situations in which access to mechanisms for directly powering the device (e.g., access to external power wires and/or batteries) is limited and/or nonexistent.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of devices" can refer to one or more devices.

FIG. 1 illustrates a portion of a computing device 100 in accordance with one or more embodiments of the present disclosure. Computing device 100 can receive and/or transmit data while not directly powered and/or while powered off, as will be further described herein.

Computing device 100 can be, for example, an energy management device (e.g., a one-way communicating energy management device such as a switch to cycle an air conditioning unit and communicating thermostats), a consumer electronics device (e.g., a DVD player), a subscriber device (e.g., a modem such as a DSL or cable modem, a mobile and/or smart phone, an encrypted disk drive, or a smart grid device such as a smart meter), or an automotive electronic device (e.g., automotive audio equipment or another electronic device within a vehicle), among other types of computing devices. However, embodiments of the present disclosure are not limited to a particular type of computing device.

Computing device 100 may include smart card technology, as will be further described herein. However, computing device 100 can also include additional technology (e.g., additional components, functionality, and/or capabilities) beyond that of smart cards, as will be further described herein.

As shown in FIG. 1, computing device 100 includes an interface 102, a memory chip 104, and a processor 106. Interface 102 and processor 106 can be coupled to memory chip 104, as illustrated in FIG. 1. Interface 102 can be, for example, a radio frequency (RF) interface and/or a contactless smart card, such as an ISO 14443 A, B, or C, ISO 15693, ISO 18000 series, or ISO 11785. That is, interface 102 can include contactless smart card technology. Processor 106 can be, for example, a microprocessor and/or a microcontroller. Memory chip 104 can be, for example, an integrated circuit that includes a number of transistors and/or capacitors. However, embodiments of the present disclosure are not limited to a particular type of interface, processor, or memory chip.

As shown in FIG. 1, interface 102 includes an antenna 112, a power module 114, a modulator/demodulator 116, and an encoder/decoder 118. Antenna 112 can be, for example, an RF antenna that can receive an RF signal from and/or transmit (e.g., send) an RF signal to an additional device (not shown in FIG. 1). Power module 114 can be, for example, an RF to direct current (DC) power module that can generate DC power and/or energy using a received RF signal. For example, power module 114 can convert current produced by a received RF signal to DC power. Modulator/demodulator 116 can demodulate (e.g., extract data from) a received RF signal and/or modulate (e.g., add data to) an RF signal to be transmitted to an additional device. Encoder/decoder 118 can decode data (e.g., convert data from one form to another) extracted from a received RF signal and/or encode data (e.g., convert data from one form to another in a reverse manner from the decoding) to be added to an RF signal to be transmitted to an additional device. However, embodiments of the present disclosure are not limited to a particular type of antenna, power module, modulator/demodulator, or encoder/decoder.

As shown in FIG. 1, memory chip 104 includes a memory 122 and an authentication and access control module 124 that can authenticate (e.g., permit and/or prevent) access to memory 122. For example, authentication and access control module 124 can permit and/or prevent data from being programmed (e.g., written) into and/or stored in memory 122, and/or permit and/or prevent data stored in memory 122 from being sensed (e.g., read).

Memory 122 can be nonvolatile memory. Memory 122 can also be removable, e.g., portable memory, or non-removable, e.g., internal memory. For example, memory 122 can be electrically erasable programmable read-only memory (EEPROM), flash memory, phase change random access memory (PCRAM), and/or a magnetic medium such as magnetoresistive random access memory, among other types of memory.

Further, although memory 122 is illustrated as being located in computing device 100, embodiments of the present disclosure are not so limited. For example, memory 122 can be located in a stand alone device (e.g., a SIM card) and/or can be located internal to another computing resource, e.g., enabling computer readable instructions to be downloaded over the Internet or another type of wired or wireless connection.

In some embodiments, memory chip 104 (e.g., memory 122) can be a dual ported memory (e.g., a memory having two different ports). In such embodiments, interface 102 can be coupled to one port of the dual ported memory, and processor 106 can be coupled to the other (e.g., second) port. For example, the second port can be directly connected to a bus associated with processor 106, such as, for example, a standard processor bus or a serial bus such as an I2C, SPI, or USB, among other types of busses.

In some embodiments, memory chip 104 (e.g., memory 122) can be a single ported memory (e.g., a memory having one port). In such embodiments, interface 102 and processor 106 may be implemented in circuits outside of memory chip 104, with the circuits coupled to the single port.

As shown in FIG. 1, computing device 100 includes a user interface 108. User interface 108 can permit a user (e.g., a user of computing device 100) to interact with computing device 100. For example, user interface can include a status light-emitting diode (LED), a keypad, a liquid crystal display (LCD), and/or a number of buttons, among other components, that can permit a user to interact with computing device 100. Accordingly, computing device 100 can include components, functionality, and/or capabilities) beyond that of smart cards.

Computing device 100 can operate in at least two different power modes. For example, computing device 100 can operate in a first power mode in which computing device 100 is powered only via interface 102, and in a second power mode in which computing device 100 is powered by a non-radio frequency (non-RF) power source, such as, for example, a battery, an external power wire, and/or a solar power source, among other types of non-RF power sources. The operation of computing device 100 while in the first power mode will be further described herein.

Computing device 100 can receive and/or transmit data while not directly powered and/or while powered off (e.g., while operating in the first power mode in which computing device 100 is powered only via interface 102). For example, computing device 100 can receive and/or transmit data without being coupled to an external power wire (e.g., without being coupled to an external wire or cable that is coupled to an external power source), without using a battery (e.g., while computing device 100 does not include a battery such as an internal battery), and/or without using any other type of direct powering mechanism. For instance, computing device 100 can receive and/or transmit data while located inside packaging (e.g., without being removed from the packaging), and/or in situations in which access to external power wires and/or batteries is limited and/or nonexistent.

As an example in which computing device 100 receives data while not directly powered and/or while powered off, interface 102 (e.g., antenna 112) can receive data from an additional device (not shown in FIG. 1) while computing device 100 is not directly powered and/or is powered off. The additional device can be, for example, an RF device, such as, for instance, a handheld RF reader or scanner. The data can include, for example, personalized data for computing device 100, such as, for instance, configuration data for computing device 100. However, embodiments of the present disclosure are not limited to a particular type of additional device or data.

Interface 102 (e.g., antenna 112) can receive the data, for example, via an RF signal (e.g., an RF power signal) received from the additional device while computing device 100 is not directly powered and/or is powered off. For instance, the data can be included in (e.g., can be a part of) the RF signal received from the additional device. Interface 102 (e.g., modulator/demodulator 116) can extract the data from the received RF signal, and interface 102 (e.g., encoder/decoder 118) can decode the extracted data (e.g., convert the extracted data from one form to another).

Interface 102 (e.g., power module 114) can generate power and/or energy (e.g., DC power and/or energy) using the RF signal received from the additional device. That is, the received RF signal can provide power and/or energy to computing device 100 while computing device 100 is not directly powered and/or is powered off. For example, power module 114 can convert current produced by the received RF signal to power and/or energy. That is, the received RF signal can produce current that can provide power and/or energy to computing device 100 while computing device 100 is not directly powered and/or is powered off.

Interface 102 can transmit the data received from the additional device (e.g., the data received via the RF signal from the additional device) to memory chip 104 (e.g., memory 122) while computing device 100 is not directly powered and/or is powered off. That is, memory 122 can receive the data from interface 102 while computing device 100 is not directly powered and/or is powered off. For example, the data can be programmed into memory 122 via interface 102 and/or stored by memory 122 while computing device 100 is not directly powered and/or is powered off. That is, the additional device can program the data into memory 122 via interface 102 while computing device 100 is not directly powered and/or is powered off.

In some embodiments, the additional device may program data into memory 122 via interface 102 only if the additional device transmits an authentication mechanism to computing device 100 (e.g., to authentication and control module 124). That is, the additional device may program data into memory 122 via interface 102 only if computing device 100 (e.g., authentication and control module 124) receives an authentication mechanism from the additional device. The authentication mechanism can be, for example, an account, user name, and/or password (e.g., a fixed or one time password), and/or a cryptographic authentication mechanism. The authentication mechanism can be, for instance, received via the RF signal from the additional device (e.g., the authentication mechanism can be included in the RF signal along with the data).

In some embodiments, an additional device may not be able to program data into memory 122 via interface 102. For example, computing device 100 (e.g., authentication and access control module 124) can prevent an additional device from programming data into memory 122 via interface 102. In such embodiments, for instance, the additional device may only be able to receive data from computing device 100 via interface 102 (e.g., computing device 100 may only be able to transmit data to the additional device via interface 102).

As an example in which computing device 100 transmits data while not directly powered and/or while powered off, interface 102 (e.g., antenna 112) can receive an RF signal (e.g., an RF power signal) from an additional device (not shown in FIG. 1) while computing device is not directly powered and/or is powered off. The additional device can be, for example, an RF device, such as, for instance, a handheld RF reader or scanner. However, embodiments of the present disclosure are not limited to a particular type of additional device.

Interface 102 (e.g., power module 114) can generate power and/or energy (e.g., DC power and/or energy) using the RF signal received from the additional device. That is, the received RF signal can provide power and/or energy to computing device 100 while computing device 100 is not directly powered and/or is powered off, as previously described herein.

Data stored in memory chip 104 (e.g., in memory 122) can be transmitted (e.g., sent) from memory 122 to interface 102 while computing device 100 is not directly powered and/or is powered off. That is, interface 102 can receive the data stored in memory 122 from memory 122 while computing device 100 is not directly powered and/or is powered off. The data can include, for example, data associated with computing device 100, such as, for instance, history, usage, and/or diagnostic data associated with computing device 100. However, embodiments of the present disclosure are not limited to a particular type of data.

Interface 102 (e.g., encoder/decoder 118) can encode the data received from memory 122 (e.g., convert the data from one form to another), interface 102 (e.g., modulator/demodulator 116) can modulate (e.g., add the data to) an RF signal, and interface 102 (e.g., antenna 112) can transmit (e.g., send) the data via the RF signal (e.g., as a part the RF signal) to the additional device while computing device 100 is not directly powered and/or is powered off. That is, the additional device can sense (e.g., read) the data stored in memory 122 via interface 102 while computing device 100 is not directly powered and/or is powered off.

In some embodiments, the additional device may sense the data stored in memory 122 via interface 102 only if the additional device transmits an authentication mechanism to computing device 100 (e.g., to authentication and access control module 124). That is, the additional device may sense the data stored in memory 122 via interface 102 only if computing device 100 (e.g., authentication and access control module 124) receives an authentication mechanism from the additional device. The authentication mechanism can be analogous to the authentication mechanism previously described herein.

In some embodiments, an additional device may not be able to sense the data stored in memory 122 via interface 102. For example, computing device 100 (e.g., authentication and access control mechanism 124) can prevent an additional device from sensing the data stored in memory 122 via interface 102. In such embodiments, for instance, the additional device may only be able to transmit data to memory 122 via interface 102 (e.g., computing device 100 may only be able to receive data from the additional device via interface 102).

In some embodiments, processor 106 can sense (e.g., read) data stored in memory 122, such as, for example, the data received from an additional device while computing device 100 is not directly powered and/or is powered off. For instance, computing device 100 (e.g., authentication and access control module 124) can permit processor 106 to sense the data stored in memory 122. For example, computing device 100 (e.g., authentication and access control module 124) can include a hardware mechanism (e.g., a sense line) that can be used by processor 106 to sense the data stored in memory 122.

In some embodiments, processor 106 may not be able to sense data stored in memory 122. For instance, computing device 100 (e.g., authentication and access control module 124) can prevent processor 106 from sensing the data stored in memory 122. For example, computing device 100 (e.g., authentication and access control module 124) may block access to memory 122 if processor 106 does not provide proper authentication.

In some embodiments, processor 106 can program (e.g., write) data into memory 122, such as, for example, the data to be transmitted to an additional device while computing 100 is not directly powered and/or is powered off. For instance, computing device 100 (e.g., authentication and access control module 124) can permit processor 106 to program data into memory 122. For example, computing device 100 (e.g., authentication and access control module 124) can include a hardware mechanism (e.g., a program line) that can be used by processor 106 to program data into memory 122.

In some embodiments, processor 106 may not be able to program data into memory 122. For instance, computing device 100 (e.g., authentication and access control module 124) can prevent processor 106 from programming data into memory 122. For example, computing device 100 (e.g., authentication and access control module 124) may not include a hardware mechanism (e.g., a program line) that can be used by processor 106 to program data into memory 122. Such embodiments can be used to support loading of tamper resistant license keys which can be sensed by software and/or firmware in computing device 100.

In some embodiments, memory chip 104 (e.g., memory 122) can be partitioned into a number of different portions. In some such embodiments, data may be received by one or more portions of memory 122 from an additional device (not shown in FIG. 1) via interface 102 and/or stored in the one or more portions of memory 122 while computing device 100 is not directly powered and or is powered off, data may be received by one or more (e.g., one or more other) portions of memory 122 from an additional device via interface 102 and/or stored in the one or more (e.g., other) portions of memory 122 only if the additional device transmits an authentication mechanism to computing device 100 (e.g., to authentication and control module 124), and/or data may not be received by one or more (e.g., one or more additional other) portions of memory 122 from an additional device via interface 102 or stored in the one or more (e.g., additional other) portions of memory 122 (e.g., computing device 100 can prevent the one or more additional other portions of memory 122 from receiving and/or storing the data). As an example, a first portion of memory 122 may store data received from an additional device via interface 102 regardless of whether computing device 100 receives an authentication mechanism from the additional device, a second portion of memory 122 may store data received from an additional device via interface 102 only if computing device 100 receives an authentication mechanism from the additional device, and a third portion of memory 122 may be prevented from storing data received from an additional device via interface 102 by computing device 100 (e.g., by authentication and access control module 124).

In some embodiments in which memory chip 104 (e.g., memory 122) is partitioned into a number of different portions, data stored in one or more portions of memory 122 can be transmitted to an additional device (not shown in FIG. 1) via interface 102 while computing device 100 is not directly powered and/or is powered off, data stored in one or more (e.g., one or more other) portions of memory 122 can be transmitted to an additional device via interface 102 only if the additional device transmits an authentication mechanism to computing device 100 (e.g., to authentication and control module 124), and/or data stored in one or more (e.g., one or more additional other) portions of memory 122 may not be transmitted to an additional device via interface 102 (e.g., computing device 100 can prevent the one or more additional other portions of memory 122 from transmitting the data to the additional device). As an example, data stored in a first portion of memory 122 and data stored in a second portion of memory 122 can be transmitted to an additional device via interface 102 regardless of whether computing device 100 receives an authentication mechanism from the additional device. As an additional example, data stored in a first portion of memory 122 can be transmitted to an additional device via interface 102 only if computing device 100 receives an authentication mechanism from the additional device and data stored in a second portion of memory 122 can be transmitted to the additional device via interface 102 regardless of whether computing device 100 receives an authentication mechanism from the additional device. As a further example, data stored in a first portion of memory 122 can be transmitted to an additional device via interface 102 only if computing device 100 receives an first authentication mechanism from the additional device and data stored in a second portion of memory 122 can be transmitted to the additional device via interface 102 only if computing device 100 receives a second (e.g., different) authentication mechanism from the additional device.

In some embodiments in which memory chip 104 (e.g., memory 122) is partitioned into a number of different portions, processor 106 can sense data stored in one or more portions of memory 122, and processor 106 may not be able to sense data stored in one or more (e.g., one or more other) portions of memory 122 (e.g., computing device 100 can prevent processor 106 from sensing data stored in the one or more other portions of memory 122). Additionally and/or alternatively, processor 106 can program data into one or more portions of memory 122, and processor 106 may not be able to program data into one or more (e.g., one or more other) portions of memory 122 (e.g., computing device 100 can prevent processor 106 from programming data into the one or more other portions of memory 122). As an example, processor 106 can sense data stored in a first portion of memory 122, program data into the first portion of memory 122, sense data stored in a second portion of memory 122, and be prevented from programming data into the second portion of memory 122 by computing device 100 (e.g., by authentication and access control module 124).

Figure 2:
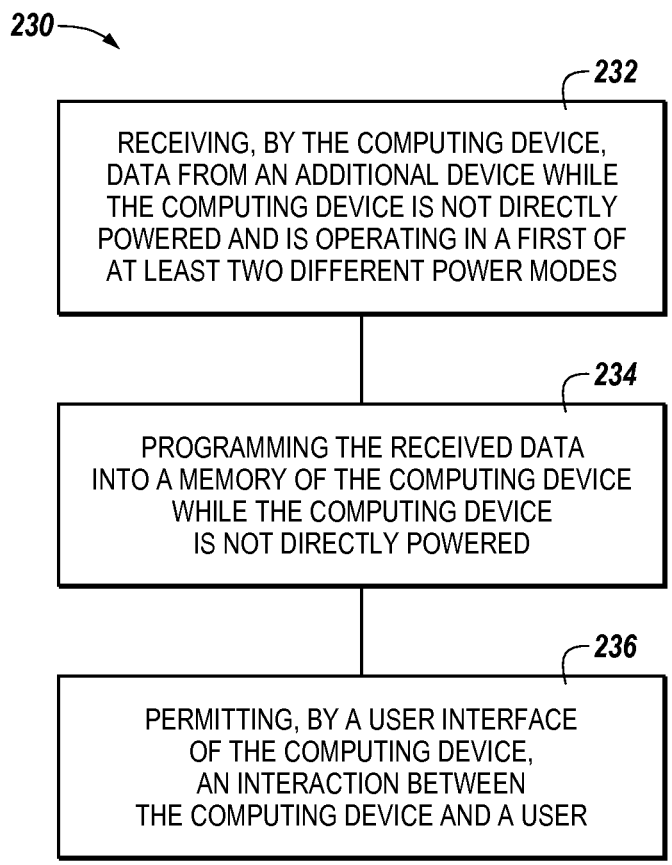
FIG. 2 illustrates a method of operating a computing device in accordance with one or more embodiments of the present disclosure.

FIG. 2 illustrates a method 230 of operating a computing device in accordance with one or more embodiments of the present disclosure. The computing device can be, for example, computing device 100 previously described in connection with FIG. 1.

At block 232, method 230 includes receiving, by the computing device, data from an additional device while the computing device is not directly powered and is operating in a first of at least two different power modes. For example, the computing device can receive the data from the additional device without being coupled to an external power wire, without using a battery, and/or without using any other type of direct powering mechanism, as previously described herein. While operating in the first power mode, the computing device may be powered only via an RF interface (e.g., interface 102 previously described in connection with FIG. 1), as previously described herein. While operating in a second (e.g., different) power mode, the computing device may be powered non-RF power source, as previously described herein.

The additional device can be, for example, an RF device, and the data received from the additional device can include, for example, personalized data for the computing device, as previously described herein. The data can be received from the additional device, for example, by an interface of the computing device (e.g., interface 102 previously described in connection with FIG. 1), as previously described herein.

At block 234, method 230 includes programming the received data into a memory of the computing device while the computing device is not directly powered. For example, the received data can be programmed into the memory of the computing device without the computing device being coupled to an external power wire, without using a battery, and/or without using any other type of direct powering mechanism, as previously described herein.

The memory of the computing device can be, for example, memory chip 104 (e.g., memory 122) previously described in connection with FIG. 1. The received data can be programmed into the memory, for example, by the additional device via the interface, as previously described herein.

At block 236, method 230 includes permitting, by a user interface of the computing device, an interaction between the computing device and a user (e.g., of the computing device).

The user interface of the computing device can be, for example, user interface 108 previously described in connection with FIG. 1.

Although not illustrated in FIG. 2, in some embodiments, method 230 can include transmitting, by the computing device, data while the computing device is not directly powered. For example, the interface of the computing device can transmit (e.g., send) data stored in the memory of the computing device to the additional device, as previously described herein.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A computing device, comprising:
    an interface configured to receive data from an additional device while the computing device is not directly powered;
    a memory coupled to the interface and configured to:
        receive the data from the interface while the computing device is not directly powered; and
        store the data while the computing device is not directly powered; and
    a user interface configured to permit a user to interact with the computing device;
    wherein the computing device is configured to operate in at least two different power modes, wherein:
        the computing device is powered only via the interface while operating in a first power mode;
        the computing device is powered by a non-radio frequency (non-RF) power source while operating in a second power mode;
    wherein the interface is configured to transmit data stored in the memory to the additional device while the computing device is not directly powered; and
    wherein the memory includes:
        a first portion configured to:
            transmit data stored in the first portion to an additional device via the interface; and
            store data received from an additional device via the interface; and
        a second portion configured to transmit data stored in the second portion to an additional device;
        wherein the computing device is configured to prevent storage of data received from an additional device via the interface in the second portion.

2. The computing device of claim 1, wherein the interface is a radio frequency (RF) interface configured to receive data via an RF signal from an additional device while the computing device is not directly powered.

3. The computing device of claim 1, wherein:
    the memory is a dual ported memory;
    the interface is coupled to a first port of the dual ported memory; and
    a processor of the computing device is coupled to a second port of the dual ported memory.

4. The computing device of claim 1, wherein the memory is a single ported memory.

5. The computing device of claim 1, wherein:
    the computing device includes a processor coupled to the memory and configured to sense data stored in the memory; and
    the computing device is configured to prevent the processor from programming data into the memory.

6. The computing device of claim 1, wherein the user interface includes at least one of:
    a status light-emitting diode (LED);
    a keypad;
    a liquid crystal display (LCD); and
    a number of buttons.

7. A method of operating a computing device, comprising:
    receiving, by the computing device, data from an additional device while the computing device is not directly powered and is operating in a first of at least two different power modes; wherein:
        the computing device is powered only via a radio frequency (RF) interface while operating in the first power mode; and
        the computing device is powered by a non-radio frequency (non-RF) power source while operating in a second power mode;
    programming the received data into a memory of the computing device while the computing device is not directly powered;
    transmitting, by the computing device, data stored in the memory of the computing device to the additional device while the computing device is not directly powered;
    permitting, by a user interface of the computing device, an interaction between the computing device and a user;
    transmitting, by a first portion of the memory, data stored in the first portion to an additional device via the RF interface only if an authentication mechanism is received from the additional device; and
    transmitting, by a second portion of the memory, data stored in the second portion to an additional device via the RF interface regardless of whether an authentication mechanism is received from the additional device.

8. The method of claim 7, wherein receiving data from an additional device while the computing device is not directly powered includes receiving the data via a radio frequency signal from the additional device while the computing device is not directly powered.

9. The method of claim 7, wherein the method includes:
    receiving data from an additional device while the computing device is located inside packaging; and programming the received data into the memory of the computing device while the computing device is located inside the packaging.

10. The method of claim 7, wherein the method includes:
receiving data from an additional device while the computing device is not directly powered includes receiving the data from the additional device while the computing device is not coupled to an external power wire and while the computing device does not include a battery; and
programming the received data into the memory of the computing device while the computing device is not directly powered includes programming the received data into the memory of the computing device while the computing device is not coupled to an external power wire and while the computing device does not include a battery.

11. The method of claim 7, wherein the method includes programming the received data into the memory of the computing device only if an authentication mechanism is received from the additional device.

12. A computing device, comprising:
a memory;
an interface coupled to the memory and configured to:
receive data from an additional device and transmit the data to the memory while the computing device is powered off; and
receive data from the memory and transmit the data received from the memory to the additional device while the computing device is powered off; and
a user interface configured to permit a user to interact with the computing device;
wherein the computing device is configured to operate in at least two different power modes, wherein:
the computing device is powered only via the interface while operating in a first power mode; and
the computing device is powered by a non-radio frequency (non-RF) power source while operating in a second power mode; and
wherein the memory includes:
a first portion configured to transmit data stored in the first portion to an additional device via the interface only if a first authentication mechanism is received from the additional device; and
a second portion configured to transmit data stored in the second portion to an additional device via the interface only if a second authentication mechanism is received from the additional device.

13. The computing device of claim 12, wherein the interface includes contactless smart card technology configured to:
receive data via a radio frequency (RF) signal from an additional device while the computing device is powered off; and
transmit data via an RF signal to an additional device while the computing device is powered off.

14. The computing device of claim 12, wherein:
the data received from an additional device and transmitted to the memory includes configuration data for the computing device; and
the data received from the memory and transmitted to an additional device includes diagnostic data associated with the computing device.

15. The computing device of claim 12, wherein the non-RF power source includes at least one of:
a battery;
an external power wire; and
a solar power source.

16. The computing device of claim 12, wherein:
the computing device includes a processor coupled to the memory and configured to:
sense data stored in the first portion of the memory;
program data into the first portion of the memory; and
sense data stored in the second portion of the memory;
wherein the computing device is configured to prevent the processor from programming data into the second portion of the memory.

* * * * *